US012579800B2

(12) United States Patent
Palatnik de Sousa et al.

(10) Patent No.: US 12,579,800 B2

(45) Date of Patent: Mar. 17, 2026

(54) MULTI-MODAL AUTOMATED EVALUATION FOR IMPROVED ACCESSIBILITY

(71) Applicant: Dell Products L.P., Round Rock, TX (US)

(72) Inventors: Iam Palatnik de Sousa, Rio de Janeiro (BR); Shary Beshara, Cairo (EG)

(73) Assignee: Dell Products L.P., Round Rock, TX (US)

( * ) Notice: Subject to any disclaimer, the term of this patent is extended or adjusted under 35 U.S.C. 154(b) by 390 days.

(21) Appl. No.: 18/308,767

(22) Filed: Apr. 28, 2023

(65) Prior Publication Data

US 2024/0362903 A1      Oct. 31, 2024

(51) Int. Cl.
| | |
|---|---|
| *G06V 10/82* | (2022.01) |
| *G06F 40/117* | (2020.01) |
| *G06V 10/764* | (2022.01) |

(52) U.S. Cl.
CPC ............ *G06V 10/82* (2022.01); *G06F 40/117* (2020.01); *G06V 10/764* (2022.01)

(58) Field of Classification Search
CPC ...... G06V 10/82; G06V 10/764; G06F 40/117
See application file for complete search history.

(56) References Cited

U.S. PATENT DOCUMENTS

| | | | | |
|---|---|---|---|---|
| 2013/0024441 | A1* | 1/2013 | Sun | ....................... G06F 16/951 |
| | | | | 707/E17.108 |
| 2021/0073617 | A1* | 3/2021 | Bazzani | ................. G06V 10/82 |
| 2022/0067506 | A1* | 3/2022 | Li | ...................... G06V 10/7753 |
| 2023/0153522 | A1* | 5/2023 | Cho | ...................... G06F 18/214 |
| | | | | 382/159 |
| 2023/0326178 | A1* | 10/2023 | Marri | .................... G06N 3/088 |
| | | | | 382/100 |
| 2024/0046616 | A1* | 2/2024 | Kim | ...................... G06V 10/82 |
| 2024/0256597 | A1* | 8/2024 | Zhang | .................... G06F 40/40 |
| 2025/0173613 | A1* | 5/2025 | Oktay | .................... G16H 15/00 |

OTHER PUBLICATIONS

[1] Radford, A., Kim, J.W., Hallacy, C., Ramesh, A., Goh, G., Agarwal, S., Sastry, G., Askell, A., Mishkin, P., Clark, J. and Krueger, G., Jul. 2021. Learning transferable visual models from natural language supervision. In International Conference on Machine Learning (pp. 8748-8763). PMLR. https://equalizedigital.com/accessibility-checker/low-quality-alternative-text (accessed Jan. 2023).

* cited by examiner

*Primary Examiner* — Utpal D Shah

(74) *Attorney, Agent, or Firm* — Workman Nydegger

(57) ABSTRACT

One example method includes a machine-learning (ML) model receiving a first input that includes images that have been extracted from a web page and a second input that includes alt-texts that have been extracted from the web page. The alt-texts describe the images. The ML model converts the images into a first embedding representation and converts the alt-texts into a second embedding representation. Based on the first and second embedding representations, a similarity score between the images and the alt-texts is calculated. The similarity score specifies how accurately each of the alt-texts describe the images. The one of the alt-texts having the highest similarity score is then selected.

18 Claims, 7 Drawing Sheets

600

Receive Images and Alt-Texts Extracted From A Web Page    ⟋ 610

Convert The Images Into A First Embedding Representation    ⟋ 620

Convert The Alt-Texts Into A Second Embedding Representation    ⟋ 630

Calculate A Similarity Score    ⟋ 640

Select Alt-text Having Highest Similarity Score    ⟋ 650

700

Memory 702

NVRAM 704

Processor 706

Application(s) 714

Storage Media 708

UI Device 710

Data Storage 712

MULTI-MODAL AUTOMATED EVALUATION FOR IMPROVED ACCESSIBILITY

FIELD OF THE INVENTION

Embodiments of the present invention generally relate to Alternative Text (alt-text) used in a web page. More particularly, at least some embodiments of the invention relate to systems, hardware, software, computer-readable media, and methods for evaluating existing alt-texts and recommending actions accordingly in case the alt-text does not meet certain quality thresholds so as to improve accessibility for blind and visually impaired users using screen readers.

BACKGROUND

Alternative Text (alt-text) is a type of caption used to provide a written description of images on a web page. The main goal of alt-text is to improve accessibility for blind and visually impaired users using screen readers. However, web pages often provide poor-quality alt-text that does not accurately describe the image or provides irrelevant information. This can lead to poor user experience. For example, poor-quality alt-text does not provide the same user experience for blind and visually impaired users that sighted users enjoy and can cause confusion or misunderstanding. Further, search engines rely on alt-text to interpret the content of images. Therefore, providing low-quality alt-text negatively affects the searchability and search engine optimization (SEO) performance of websites.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
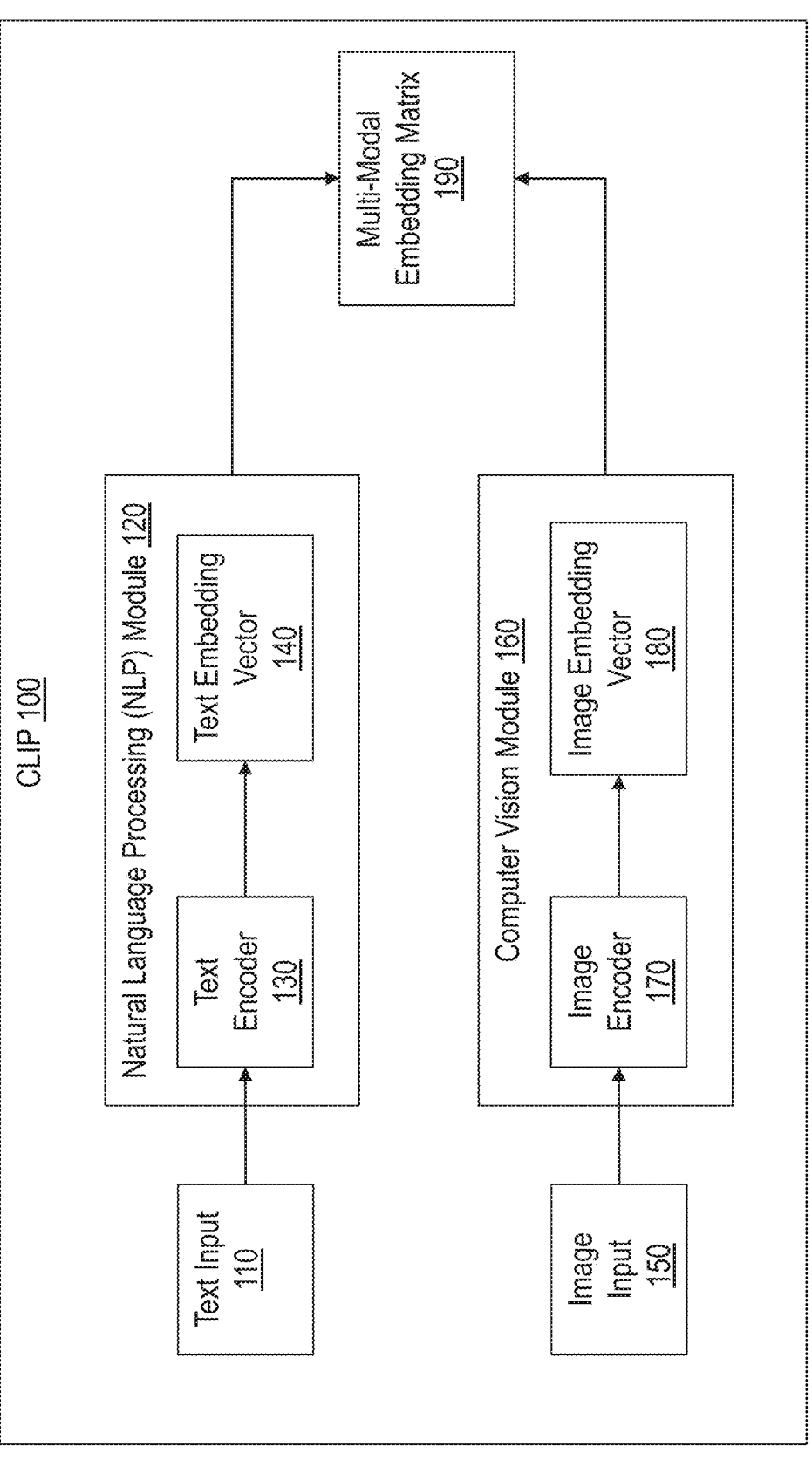
FIG. 1 discloses aspects of a Contrastive Language Image Pretraining (CLIP) model according to embodiments disclosed herein.

Embodiments of the present invention generally relate to Alternative Text (alt-text) used in a web page. More particularly, at least some embodiments of the invention relate to systems, hardware, software, computer-readable media, and methods for evaluating existing alt-texts and recommending actions accordingly in case the alt-text does not meet certain quality thresholds so as to improve accessibility for blind and visually impaired users using screen readers.

In general, example embodiments of the invention include receiving two inputs including a set of images from a given web-page, and a list of candidate alt-texts for each image crawled from the same webpage. The images and texts are converted into embedding representations using one or more machine learning models, which may include the Contrastive Language Image Pretraining (CLIP) model. The one or more machine models calculate a similarity score such as a cosine-similarity between the embedding representations. Additional complexity scores based on the text content may be calculated as well. The best or most accurate alt-text is selected based on either the similarity score or a combination of the similarity and complexity scores. In some embodiments, if no alt-texts meet a defined score threshold, a recommendation to generate new alt-texts is provided.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. Also, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is the improved accessibility and user experience for blind and visually impaired users using screen readers. Since the embodiments disclosed herein select the best or most accurate alt-text for use in the screen readers, confusion and misunderstanding are reduced for the blind and visually impaired users and an experience closer to that of sighted user is obtained. Further, the embodiments disclosed herein lead to improved machine operation since the best alt-text will improve search engines, thus improving searchability and search engine optimization (SEO) performance of websites. This leads to a reduction in computing system processing resources.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of Alt-Text

Alt-text is the common name for "alternative text", which refers to a short description that is used to describe images displayed on web pages. In many embodiments, alt-text is included inside HTML "alt" tag in the HTML "img" element. There are many reasons for using alt-text. One reason is to improve accessibility for blind and visually impaired users. Screen readers read the alt-text to describe the images to help the blind and visually impaired users understand the images' intent. For example, if the alt-text states "man sitting with laptop and dog", then the screen reader would read this text so that the blind and visually impaired user would understand that the image was of a man using a laptop and his dog.

Another reason for using alt-text is to help sighted users in cases where the sighted users are not able to view an image. This may be caused because the image did not load in the web page, or the sighted user has slow bandwidth that is not able to quickly load the image. In either case, the webpage may show the alt-text so that the sighted user is able to understand the content of the image. As in the example above, if the alt-text states "man sitting with laptop and dog", then this would be shown in the webpage instead of the image and the sighted user could read the alt-text to understand that the image was of a man using a laptop and his dog.

A further reason to use alt-text is to improve the operation of search engines. In operation, search engines are able to use the alt-text to interpret what an image on a website is. This in turn improves a website's searchability since the search engine can more quickly and easily interpret the image. Thus, the SEO performance of the website is improved, which may lead to the search engine finding the website more quickly and easily.

B. Aspects of Contrastive Language Image Pretraining (CLIP) Model

Contrastive Language Image Pretraining (CLIP) is part of a class of models known as transformers, which are models that depend primarily on a mechanism known as self-attention. This is a kind of neural network layer that allows a model to learn which parts of an input to focus on to improve their performance on a number of downstream tasks.

In particular, CLIP combines both Natural Language Processing (NLP) and Computer Vision (CV) tasks into a single model. Thus, the CLIP model includes both an NLP module that receives a text input and a CV module that receives an image input. The text input and the image input are converted into embedding vectors with the same dimensions, which may be shaped 1×512 in some embodiments, and the text and image embeddings are then combined into an embedding matrix. The embedding matrix can be understood as a vector representation that combines visual and textual information into the same space. The vector representation also has information on the similarity between the input text and image embeddings. Because of this, CLIP embedding matrixes can be used to easily calculate the similarity between the vector representations of any image and any text. In one embodiment, the CLIP embedding matrixes are used to calculate a cosine similarity between the vector representations of the image and the text.

FIG. 1 illustrates an example embodiment of a CLIP model 100. As illustrated, the CLIP model receives a text input 110 from a source such as a website. The text input 110 is then provided to an NLP module 120 for further processing. The NLP module 120 includes a text encoder 130 that encodes the text input 110 to generate an alt-text embedding vector 140.

As further illustrated, the CLIP model receives an image input 150 from a source, which may be the same source as the text input. The image input 150 is then provided to a CV module 160 for further processing. CV module 160 includes an image encoder 170 that encodes the image input 150 to generate an image embedding vector 180.

The alt-text embedding vector 140 and the image embedding vector 180 are then combined by the model to generate a multi-modal embedding matrix 190. As discussed above, the multi-modal embedding matrix 190 can be used to calculate the similarity between the vector representations of text input 110 and the image input 150.

C. Aspects of the Current Invention

The current invention implements a novel system that uses a multi-modal text/image model such as the CLIP model 100 previously described as an evaluation framework for evaluating the quality of alt-texts from a website. The novel system then automatically selects the best alt-text that best correlates to or most accurately describes the image the alt-text is trying to describe.

Figure 2A:
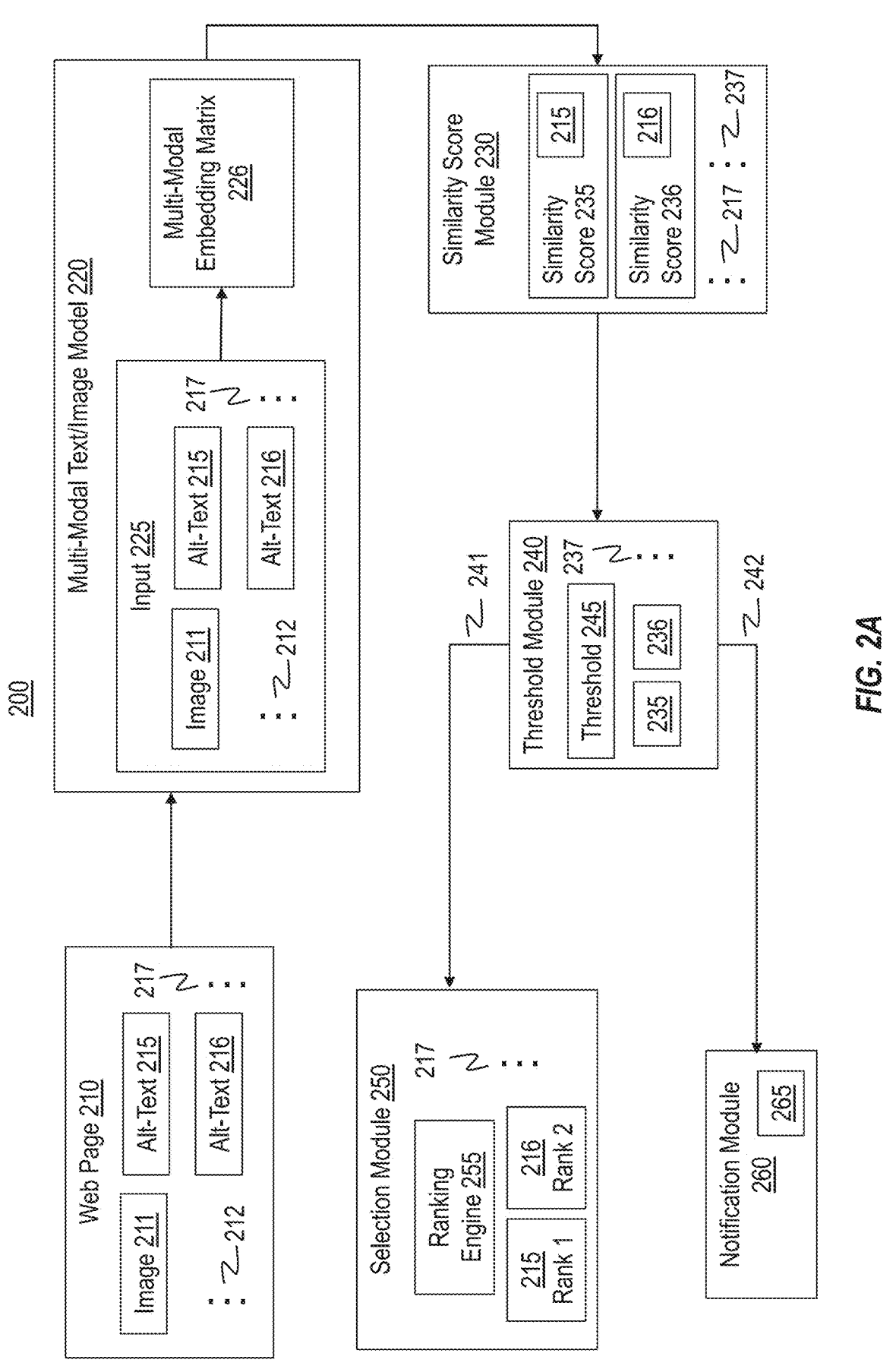
FIG. 2A discloses aspects of a system that implements an ML model to determine an alt-text that most accurately describes an image according to embodiments disclosed herein.

FIG. 2A illustrates an embodiment of a system 200 of the current invention.

Although the various elements and modules of the system 200 are shown as being separate, this is for ease of explanation only and need not always be the case. Accordingly, two or more of the illustrated elements may be part of the same machine-learning model or processing unit as circumstances warrant. For example, the various score modules may be part of multi-modal text/image model 220 to be described further.

Figure 2B:
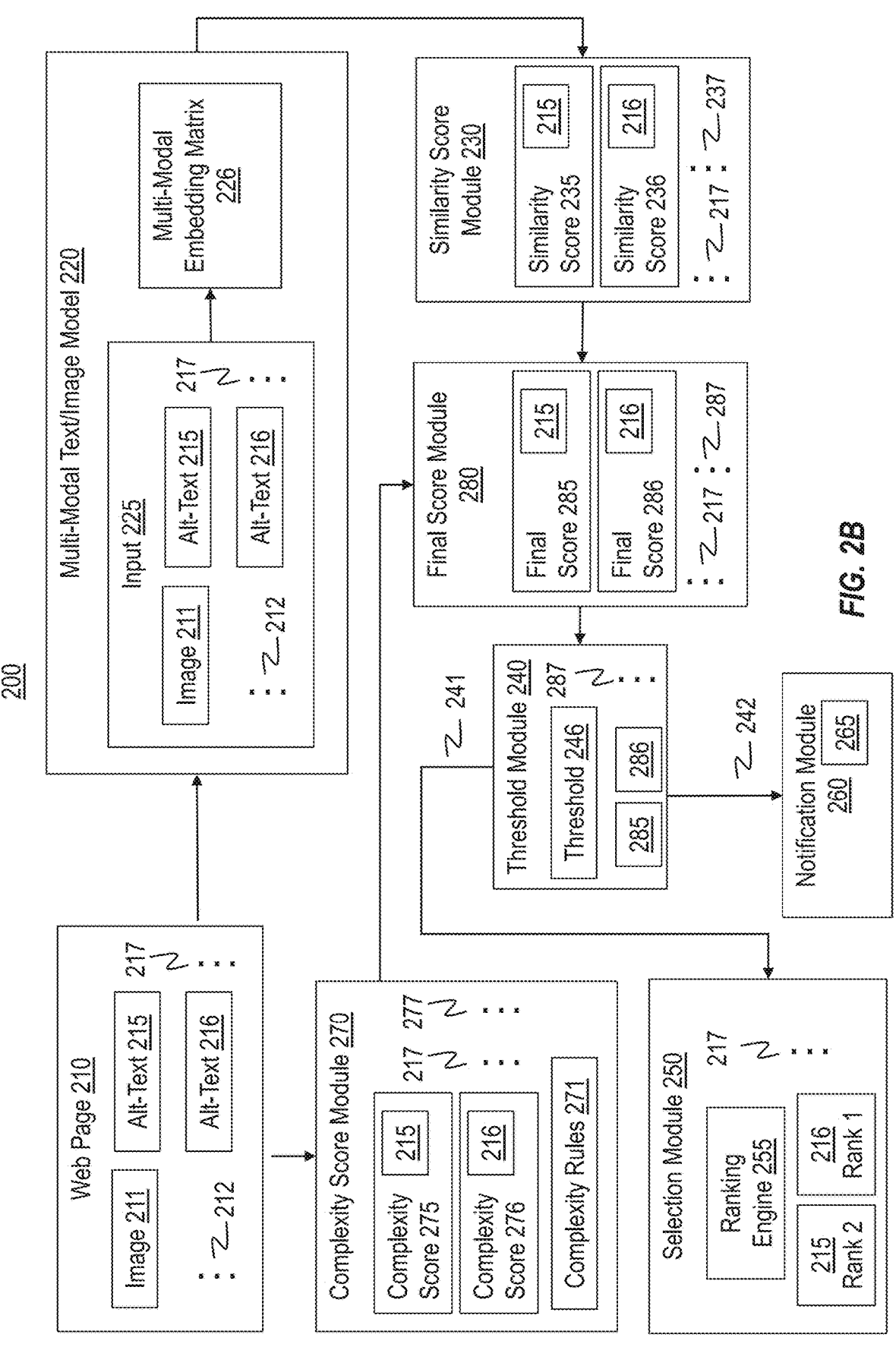
FIG. 2B illustrates an alternative embodiment of the system of FIG. 2A.

As illustrated, a web page 210 includes an image 211 as part of its underlying code that will be rendered on website when viewed in a web browser. The ellipses illustrate that the web page 210 may include any number of additional images 212. It will be appreciated that the term "web page" as used herein may also apply to a website having one or more web pages. In addition, it many embodiments the web page 210 in not part of the system 200 as it may be controlled by an entity other than the entity that controls the system 200. In such embodiments, web page 210 is shown in FIGS. 2A and 2B for ease of explanation. In other embodiments, the web page 210 may be considered as part of the system 200.

The web page 210 also includes various alt-text as part of its underlying code that provide a short description that is used to describe image 211 and/or one or more of the additional images 212. For example, the web page 210 includes alt-text 215, alt-text 216, and any number of additional alt-texts 217 as illustrated by the ellipses.

The system 200 includes a multi-modal text/image model 220. In some embodiments, the multi-modal text/image model 220 corresponds to the CLIP model 100 previously described, although this is not required as the multi-modal text/image model 220 may be any reasonable multi-modal text/image model. As illustrated, the image 211 (and potentially the additional images 212) and the alt-text 215 and 216 (and potentially the additional alt-texts 217) are extracted from the web page 210 and are provided to or otherwise accessed by the multi-modal text/image model 220 as input 225. The multi-modal text/image model 220 then generates a multi-modal embedding matrix 226 as a vector representation that combines the visual information from the image 211 (and potentially the additional images 212) and the textual information from the alt-text 215 and 216 (and potentially the additional alt-texts 217). In embodiments that utilize the CLIP model 100 as the multi-modal text/image model 220, the multi-modal embedding matrix 226 may correspond to the multi-modal embedding matrix 190 and is generated as described in relation to FIG. 1.

The system 200 also includes a similarity score module 230. As discussed previously in relation to FIG. 1, the multi-modal embedding matrix 226 can be used to calculate the similarity between the vector representation of the image 211 (and potentially the additional images 212) and the vector representation of the alt-text 215 and 216 (and potentially the additional alt-texts 217). The similarity between the images and the alt-text is given a similarity score by the similarity score module 230. In one embodiment, the similarity score is based on a c similarity calculated by the similarity score module 230. For example, the alt-text 215 is given a similarity score 235 that specifies how similar the alt-text 215 is to the image 211 (and potentially one or more of the additional images 212) and the alt-text 216 is given a similarity score 236 that specifies how similar the alt-text 216 is to the image 211 (and potentially one or more of the additional images 212). The ellipses represent that a similarity score 237 may be given to one or more of the additional alt-texts 217.

The system 200 also includes a threshold module 240. The threshold module 240 includes a threshold 245. The threshold 245 specifies an acceptable similarity score for each alt-text. In other words, the threshold 245 sets a minimum similarity score at which a given alt-text will be considered to sufficiently describe the image 211 (and potentially one or more of the additional images 212). If the similarity score for a given alt-text is above the threshold 245, then the alt-text sufficiently describes the image 211 so that the user experience for the blind and visually impaired when using a screen reader is enhanced and so that SEO of the web page 210 is also enhanced. However, if the similarity score is below the threshold 245, then the alt-text does not sufficiently describe the image 211 in a way that will enhance the user experience of the blind and visually impaired when using a screen reader or enhance the SEO of the web page 210. The threshold 245 may be predetermined by an expert in generating alt-text that sufficiently describe an image. Accordingly, the threshold module 240 receives or otherwise accesses the similarity score 235 for the alt-text 215, the similarity score 236 for the alt-text 216, and potentially one or more similarity scores 237 for one or more of the additional alt-texts 217. The similarity scores 235, 236, and potentially 237 are then compared by the threshold module 240 to the threshold 245.

The system 200 also includes a selection module 250. When at least one of the similarity scores 235, 236, and 237 are above the threshold 245, the alt-text having that similarity score is received by or otherwise accessed by the selection module 250 as shown at 241. The selection module is then able to select the best or most accurate alt-text based on the similarity score to be used to describe the image 211. In some embodiments, only a single alt-text will have a similarity score that is above the threshold 245. In such case, this alt-text by default will be selected as the best alt-text. However, in other embodiments more than one of the alt-texts will have a similarity score above the threshold 245. In such case, the selection module 250 includes a ranking engine 255 that ranks the alt-texts based on the similarity scores and then selects the alt-text having the highest similarity score as the best alt-text.

For example, suppose that the alt-text 215, the alt-text 216, and one or more of the additional alt-texts 217 all have similarity scores above the threshold 245 and are thus received by the selection module 250 as shown in FIG. 2A. The ranking engine 255 then ranks each of the alt-texts based on their similarity scores. For example, the alt-text 215 may have the highest similarity score, thus having text that is the most similar to the image 211, and be given a rank of 1. The alt-text 216 may have a similarity score that is less than the similarity score of the alt-text 215, thus having text not as similar to the image 211, and be given a rank of 2. Although not illustrated, the additional alt-texts 217 will also be given a rank by the ranking engine 255. The selection module 250 then selects the highest ranked alt-text.

The alt-text that is selected can then be used in the underlying code of the web page 210 and the other alt-texts can be removed if desired. Alternatively, perhaps the two or three highest ranked alt-texts may be used. In this way, any screen reader will only have to read the most accurate description of the image 211 to a blind or visually impaired user, thus enhancing his or her experience. In addition, search engines will more easily be able to interpret the image 211 while doing a search, thus enhancing the SEO of the web page 210.

In some instances, however, none of the similarity scores of the alt-text will be above the threshold 245. Thus, none of the alt-text sufficiently describe the image 211. For example, suppose that the similarity score 235 of the alt-text 215, the similarity score 236 of the alt-text 216, and the similarity scores 237 of any of the additional alt-texts 217 are below the threshold 245. Accordingly, as shown at 242, the threshold module 240 informs a notification module 260 that is included as part of the system 200 that none of the similarity scores are above the threshold 245. The notification module 260 then generates a notification 265. The notification 265 informs that the descriptions of the image 211 (and potentially one or more of the additional images 212) included in the current alt-texts are not sufficient and that new alt-texts that provide a better description should be added to the underlying code of the web page 210. In this way, the system 200 notifies any users that new alt-text is needed to ensure that the user experience of the blind and visually impaired using a screen reader are enhanced and that the SEO of the web page 210 is enhanced.

In some instances, a user of the system 200 may want to include user specific complexity rules for descriptions of the alt-texts. That is, in addition to wanting the descriptions of the alt-text to be similar to the image 211, the user may want to include additional requirements for the descriptions of the alt-text so as to provide additional enhancements for the blind and visually impaired using a screen reader and the SEO of the web page 210. Examples of the user specific complexity rules may include:

That descriptions are not too short, or overly long,

That description do not contain a certain set of offensive terms,

That certain keywords (e.g., 'image of', 'graph of') are not present in the description, Other common NLP related requirements that can be detected via preprocessing and regular expressions, or.

That the sentence contains necessary terms and structures to maximize SEO performance.

It will be appreciated that there may be any number of user requirements and complexity rules as circumstances warrant.

Accordingly, FIG. 2B illustrates an alternative embodiment of the system 200 that implements a complexity score module 270. As illustrated in FIG. 2B, this embodiment includes elements similar to the embodiment of FIG. 2A and thus these elements need not be described again in relation to FIG. 2B. In operation, the complexity score module 270 analyzes the alt-text 215, the alt-text 216, and potentially one or more of the additional alt-texts 217 according to various user defined complexity rules 271 and then provides a complexity score based on this analysis. In one embodiment, the complexity score module 270 comprises or implements one or more Large Language Models (LLMs) that analyze the alt-text in regard to how much the description of the alt-text fits the user defined complexity rules 271. In FIG. 2B the alt-text 215 is given a complexity score 275 and the alt-text 216 is given a complexity score 276. The ellipses represent that a complexity score 277 may be given to one or more of the additional alt-texts 217.

The complexity scores can be combined with the similarity scores to generate a final score that may improve the selection of the best alt-text. Accordingly, as illustrated in FIG. 2B, the system 200 also includes a final score module 280. The final score module receives or otherwise accesses the similarity score for each alt-text from the similarity score module 230 and receives or otherwise accesses the complexity score for each alt-text from the complexity score module 270. The final score module 280 then combines the complexity score and the similarity score to generate a final score for each alt-text. In FIG. 2B the alt-text 215 is given a final score 285 and the alt-text 216 is given a final score 286. The ellipses represent that a final score 287 may be given to one or more of the additional alt-texts 217.

In the embodiment of FIG. 2B, the threshold module 240 includes a threshold 246. The threshold 246 specifies an acceptable final score for each alt-text and in some embodiments may be the same as the threshold 245. In other words, the threshold 246 sets a minimum final score at which a given alt-text will be considered to sufficiently describe the image 211 (and potentially one or more of the additional images 212). If the final score for a given alt-text is above the threshold 246, then the alt-text sufficiently describes the image 211 so that the user experience for the blind and visually impaired when using a screen reader is enhanced and so that SEO of the web page 210 is also enhanced. However, if the final score is below the threshold 246, then the alt-text does not sufficiently describe the image 211 in a way that will enhance the user experience of the blind and visually impaired when using a screen reader or enhance the SEO of the web page 210. The threshold 246 may be predetermined by an expert in generating alt-text that sufficiently describe an image. Accordingly, the threshold module 240 receives or otherwise accesses the final score 285 for the alt-text 215, the final score 286 for the alt-text 216, and potentially one or more final scores 287 for one or more of the additional alt-texts 217. The final scores 285, 286, and potentially 287 are then compared by the threshold module 240 to the threshold 246.

When at least one of the final scores 285, 286, and potentially 287 are above the threshold 246, the alt-text having that final score is received by or otherwise accessed by the selection module 250 as shown at 241. The selection module is then able to select the best alt-text based on the final score to be used to describe the image 211. In some embodiments, only a single alt-text will have a final score that is above the threshold 246. In such case, this alt-text by default will be selected as the best alt-text. However, in other embodiments more than one of the alt-texts will have a final score above the threshold 245. In such case, the ranking engine 255 ranks the alt-texts based on the final scores and then selects the alt-text having the highest final score as the best alt-text.

For example, suppose that the alt-text 215, the alt-text 216, and one or more of the additional alt-texts 217 all have final scores above the threshold 246 and are thus received by the selection module 250 as shown in FIG. 2B. The ranking engine 255 then ranks each of the alt-texts based on their final scores. For example, the alt-text 216 may have the highest final score, thus having text that is the most related to the image 211, and be given a rank of 1. The alt-text 215 may have a final score that is less than the final score of the alt-text 216, thus having text not as related to the image 211, and be given a rank of 2. Although not illustrated, the additional alt-texts 217 will also be given a rank by the ranking engine 255. The selection module 250 then selects the highest ranked alt-text.

It will be noted that in the embodiment of FIG. 2A, the alt-text 215 was ranked number 1 based on the similarity scores. However, in the embodiment of FIG. 2B, the alt-text 216 was ranked number 1 based on the final score that is the combination of the similarity score and the complexity score. This is done to illustrate that in some embodiments the combination of the complexity score and the similarity score may select a more accurate alt-text that just by using the similarity score by itself. Of course, this need not always be the case as in some embodiments the alt-text having the highest similarity score will also have the highest final score.

The alt-text that is selected can then be used in the underlying code of the web page 210 and the other alt-texts can be removed if desired as described in relation to FIG. 2A. In addition, if none of the final scores are above the threshold 246, the notification module 260 generates a notification 265 as previously described.

Figure 3:
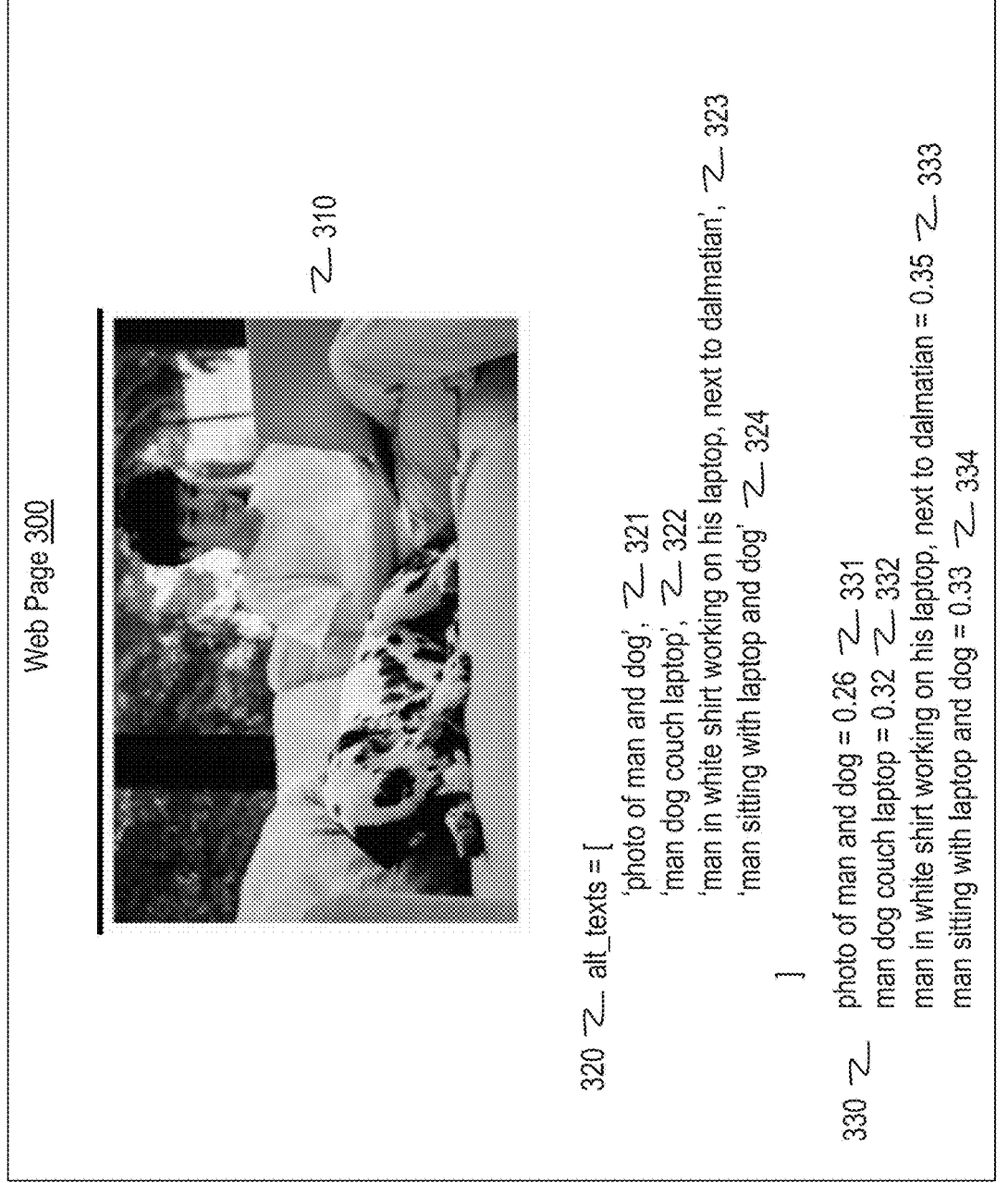
FIG. 3 illustrates a web page that implements the systems of FIGS. 2A and 2B according to embodiments disclosed herein.

FIG. 3 illustrates a use of the system 200. As shown, FIG. 3 shows a web page 300 that may correspond to the web page 210. The web page 300 includes in its underlying code an image 310, which shows a man with a laptop on a couch next to his dalmatian dog.

The underlying code also includes four different alt-texts 320 that describe the image 310 in various ways. For example, an alt-text 321 reads "photo of man and dog", an alt-text 322 reads "man dog couch laptop", an alt-text 323 reads "man in white shirt working on his laptop, next to dalmatian", and an alt-text 324 reads "man sitting with laptop and dog".

The system 200 is then applied to the web page 300. That is, as previously described, the image 310 and the four different alt-texts 320 are extracted from the web page 300 and operated upon by the various models and modules of the system 200 to analyze and select the alt-text that most accurately describes the image 310. It is also assumed that the term "photo of", "photograph of", "image of", "picture of", "drawing of" or like terms are undesirable in any alt-text since these terms describe what the image is (e.g., a picture or a photo) and do not describe what the contents of the image are.

In the embodiment of FIG. 3, only a similarity score for each of the four alt-texts 320 is generated. As shown at 330, a the similarity scores are generated by the system 200. For example, as shown at 331 the alt-text 321 has a similarity score of 0.26, as shown at 332 the alt-text 322 has a similarity score of 0.32, as shown at 333 the alt-text 323 has a similarity score of 0.35, and as shown at 334 the alt-text 321 has a similarity score of 0.33. From these scores, the alt-text 323 would be ranked number 1 and selected as most accurately describing the image 310. It is noted that the alt-text 321 received the lowest similarity score since it included the term "photo of" and as described above such terms do not add any description about the contents of the image.

FIG. 3 also shows the advantage of the system 200 of the current invention over existing systems that try to detect low-quality alt-text on websites. Such systems search for the undesirable terms such as term "photo of", "photograph of", "image of", "picture of", "drawing of" or like terms and then eliminate these terms. Accordingly, the existing systems would only eliminate alt-text 321, but would not have any meaningful way to automatically select the best alt-text between the alt-texts 322, 323, and 324. The system 200 of the current invention advantageously provides a framework for automatically selecting the best or most accurate alt-text, which is alt-text 323 in the embodiment of FIG. 3, in the manner previously described.

Figure 4:
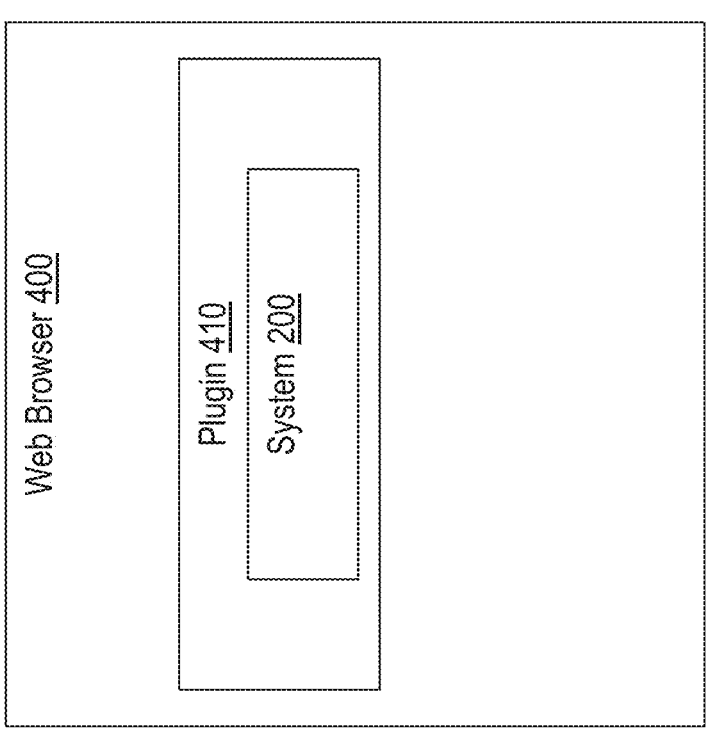
FIG. 4 illustrates a web browser that implements the systems of FIGS. 2A and 2B according to embodiments disclosed herein.

FIG. 4 illustrates an embodiment of a web browser 400 that is used to view that web page 210 or 300. The web browser 400 may be any reasonable web browser that is used to render and view the content of a website or webpage. FIG. 4 also shows that the system 200 may be implemented as web plugin 410 implemented in the web browser 400. In the this way, the web plugin 410 can automatically detect poor-quality alt-texts of websites and can notify a user that better alt-texts should be used. This can enhance the SEO of the website.

Figure 5:
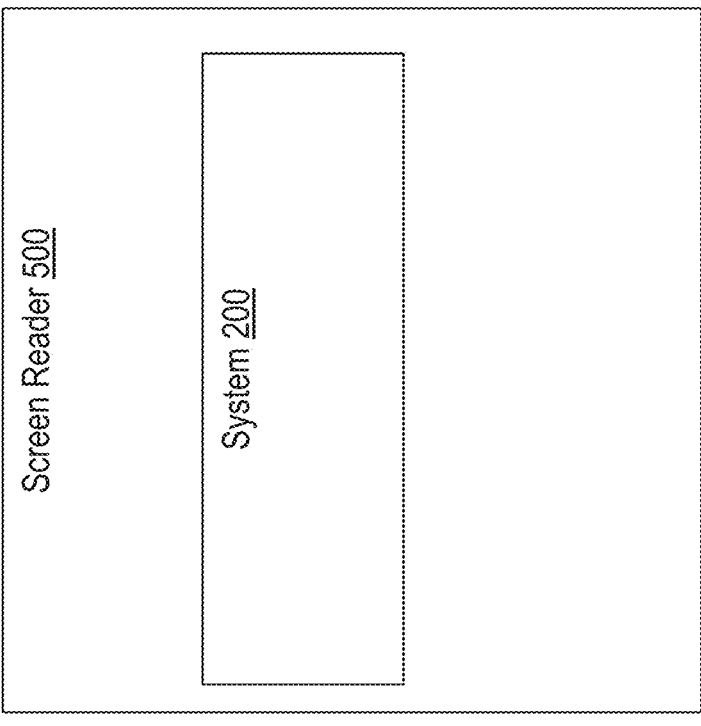
FIG. 5 illustrates a screen reader that implements the systems of FIGS. 2A and 2B according to embodiments disclosed herein.

FIG. 5 illustrates an embodiment of a screen reader 500. The screen reader 500 may be any reasonable screen reader that has the hardware and software functionality (not illustrated) to audibly read the descriptions of any images included in alt-texts associated with that image. FIG. 5 shows that the system 200 may be integrated into the hardware and software functionality of the screen reader 500. In this way, the screen reader can automatically select the alt-test that most accurately describes the underlying image. In addition, if only poor-quality alt-texts are available, a warning of this can be provided. This can enhance the user experience of the blind and visually impaired users of the screen reader 500

D. Example Methods

Figure 6:
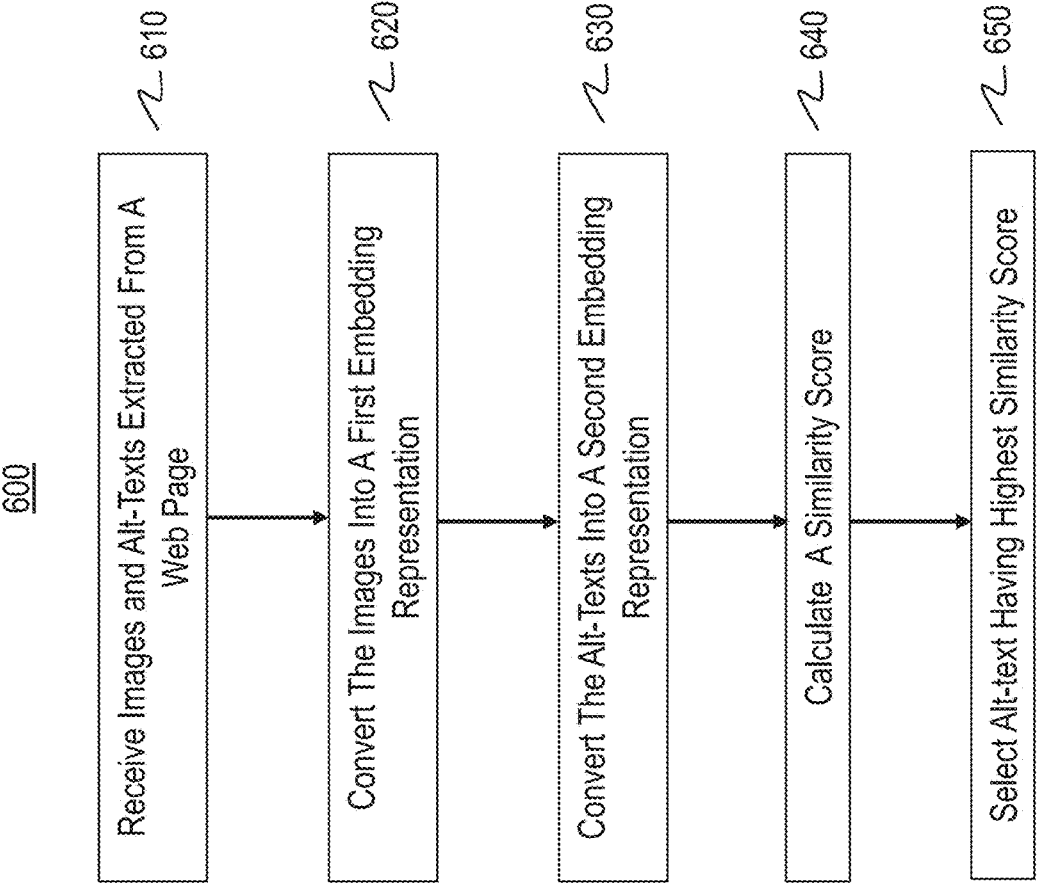
FIG. 6 illustrates a flowchart of an example method for selecting an alt-text that most accurately describes an image.

It is noted with respect to the disclosed methods, including the example method of FIG. 6, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 6, an example method 600 for selecting an alt-text that most accurately describes an image is disclosed. The method 600 will be described in relation to one or more of the figures previously described, although the method 600 is not limited to any particular embodiment.

The method 600 includes receiving at a machine-learning (ML) model a first input including one or more images that have been extracted from a web page and a second input including one or more alt-texts that have been extracted from the web page, the one or more alt-texts describing the one or more images (610). For example, as previously described the multi-modal text/image model 220 receives the image 211 (and potentially one or more of the additional images 212) and the alt-texts 215 and 216 (and potentially one or more of the additional alt-texts 217). The alt-texts provide a textual description of the images 211 and 212.

The method 600 includes converting by the ML model the one or more images into a first embedding representation (620). For example, as previously described the images 211 and 212 are converted into the image embedding vector 180, which then become part of the multi-modal embedding matrix 190 and 226.

The method 600 includes converting by the ML model the one or more alt-texts into a second embedding representation (630). For example, as previously described the alt-texts 215, 216, and 217 are converted into the alt-text embedding vector 140, which then become part of the multi-modal embedding matrix 190 and 226.

The method 600 includes calculating, based on the first and second embedding representations, a similarity score between the one or more images and the one or more alt-texts, the similarity score specifying how accurately each of the alt-texts describe the one or more images (640). For example, as previously described a similarity score 235, 236, and 237 are calculated for each of the alt-texts 215, 216, and 217 respectively. In some embodiments, the similarity score is a cosine similarity score. In other embodiments, a complexity score for each of the alt-texts is calculated and then combined with the similarity score to calculate a final score.

The method 600 includes selecting the one of the one or more alt-texts having the highest similarity score (650). For example, as previously described the alt-text having the highest similarity score is selected. In some embodiments, the selection includes comparing the similarity scores with a predefined threshold and then ranking the alt-texts based on the similarity score. In those embodiments where the final score is calculated, the alt-text having the highest final score is selected.

E. Further Example Embodiments

Following are some further example embodiments of the invention. These are presented only by way of example and are not intended to limit the scope of the invention in any way.

Embodiment 1. A method, comprising: receiving at a machine-learning (ML) model a first input including one or more images that have been extracted from a web page and a second input including one or more alt-texts that have been extracted from the web page, the one or more alt-texts describing the one or more images; converting by the ML model the one or more images into a first embedding representation; converting by the ML model the one or more alt-texts into a second embedding representation; calculating, based on the first and second embedding representations, a similarity score between the one or more images and the one or more alt-texts, the similarity score specifying how accurately each of the alt-texts describe the one or more images; and selecting the one of the one or more alt-texts having a highest similarity score.

Embodiment 2. The method of embodiment 1, further comprising: comparing the similarity score of each one or more alt-texts with a predefined threshold; and selecting the one of the one or more alt-texts having the highest similarity score from the alt-texts having a similarity score higher than the predefined threshold.

Embodiment 3. The method of embodiment 2, further comprising: ranking the alt-texts having a similarity score higher than the predefined threshold based on their similarity scores; and selecting the one of the one or more alt-texts having a highest ranking.

Embodiment 4. The method of embodiment 2, further comprising: providing a notification when none of the one or more alt-texts have a similarity score higher than the predefined threshold.

Embodiment 5. The method of embodiments 1-4, he ML model is a Contrastive Language Image Pretraining (CLIP) model.

Embodiment 6. The method of embodiments 1-5, wherein calculating, based on the first and second embedding representations comprises: combining the first embedding representation and the second embedding representation to generate a multi-modal embedding matrix; and using the multi-modal embedding matrix in the similarity score calculation.

Embodiment 7. The method of embodiments 1-6, wherein the similarity score is a cosine similarity score.

Embodiment 8. The method of embodiments 1-7, further comprising: calculating a complexity score for each of the one or more alt-texts based on one or more user defined complexity rules; combining the complexity score and the similarity score for each of the one or more alt-texts to generate a final score; and selecting the one of the one or more alt-texts having the highest final score.

Embodiment 9. The method of embodiment 8, wherein selecting the one of the one or more alt-texts having the highest final score comprises: comparing the final score of each of the one or more alt-texts with a predefined threshold; and selecting the one of the one or more alt-texts having the highest final score from the alt-texts having a final score higher than the predefined threshold.

Embodiment 10. The method of embodiment 9, further comprising: providing a notification when none of the one or more alt-texts have a final score higher than the predefined threshold.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. Also, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, or the like may refer to software objects or routines that are executed on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to conduct executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
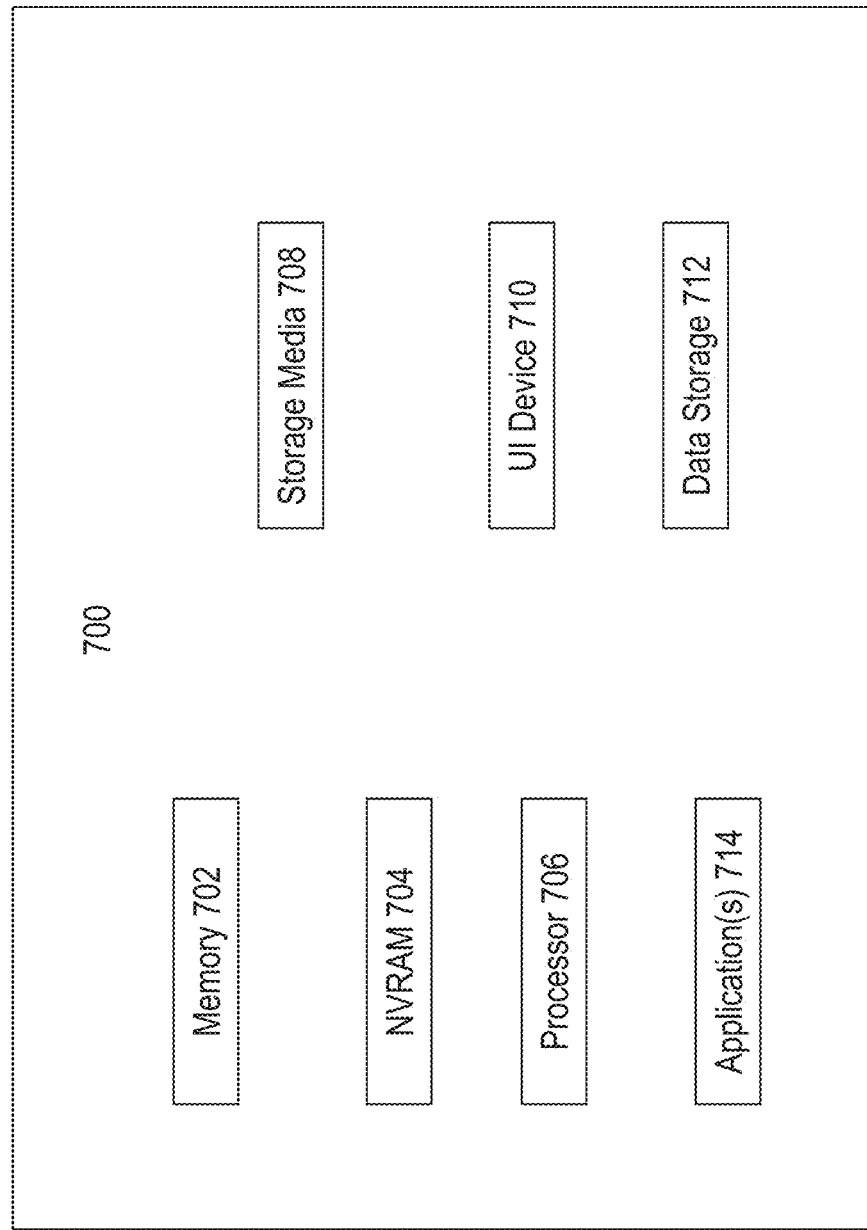
FIG. 7 illustrates an example computing entity operable to perform any of the disclosed methods, processes, and operations.

With reference briefly now to FIG. 7, any one or more of the entities disclosed, or implied, by the Figures and/or elsewhere herein, may take the form of, or include, or be implemented on, or hosted by, a physical computing device, one example of which is denoted at 700. Also, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the components of the memory 702 of the physical computing device 700 may take the form of solid-state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising: receiving, at a machine-learning (ML) model, a first input including one or more images that have been extracted from a web page and a second input including one or more alt-texts that have been extracted from the web page, the one or more alt-texts describing the one or more images;

converting, by the ML model the one or more images into a first embedding representation;

converting, by the ML model the one or more alt-texts into a second embedding representation;

calculating, based on the first and second embedding representations, a similarity score between the one or more images and the one or more alt-texts, the similarity score specifying how accurately each of the alt-texts describe the one or more images;

calculating a complexity score for each of the one or more alt-texts based on one or more user defined complexity rules;

combining the complexity score and the similarity score for each of the one or more alt-texts to generate a final score; and selecting the one of the one or more alt-texts having a highest final score.

2. The method of claim 1, wherein selecting the one of the one or more alt-texts having the highest similarity score comprises:

comparing the similarity score of each one or more alt-texts with a predefined threshold; and selecting the one of the one or more alt-texts having the highest similarity score from the alt-texts having a similarity score higher than the predefined threshold.

3. The method of claim 2, further comprising:

ranking the alt-texts having a similarity score higher than the predefined threshold based on their similarity scores; and selecting the one of the one or more alt-texts having a highest ranking.

4. The method of claim 2, further comprising:

providing a notification when none of the one or more alt-texts have a similarity score higher than the predefined threshold.

5. The method of claim 1, wherein the ML model is a Contrastive Language Image Pretraining (CLIP) model.

6. The method of claim 1, wherein calculating, based on the first and second embedding representations comprises:

combining the first embedding representation and the second embedding representation to generate a multi-modal embedding matrix; and using the muti-modal embedding matrix in the similarity score calculation.

7. The method of claim 1, wherein the similarity score is a cosine similarity score.

8. The method of claim 1, wherein selecting the one of the one or more alt-texts having the highest final score comprises:

comparing the final score of each of the one or more alt-texts with a predefined threshold; and selecting the one of the one or more alt-texts having the highest final score from the alt-texts having a final score higher than the predefined threshold.

9. The method of claim 8, further comprising:

providing a notification when none of the one or more alt-texts have a final score higher than the predefined threshold.

10. A non-transitory storage medium having stored therein instructions that are executable by one or more hardware processors to perform operations comprising: receiving, at a machine-learning (ML) model, a first input including one or more images that have been extracted from a web page and a second input including one or more alt-texts that have been extracted from the web page, the one or more alt-texts describing the one or more images;

converting, by the ML models the one or more images into a first embedding representation;

converting, by the ML model the one or more alt-texts into a second embedding representation;

calculating, based on the first and second embedding representations, a similarity score between the one or more images and the one or more alt-texts, the similarity score specifying how accurately each of the alt-texts describe the one or more images;

calculating a complexity score for each of the one or more alt-texts based on one or more user defined complexity rules;

combining the complexity score and the similarity score for each of the one or more alt-texts to generate a final score; and selecting the one of the one or more alt-texts having a highest final score.

11. The non-transitory storage medium of claim 10, wherein selecting the one of the one or more alt-texts having the highest similarity score comprises:

comparing the similarity score of each one or more alt-texts with a predefined threshold; and selecting the one of the one or more alt-texts having the highest similarity score from the alt-texts having a similarity score higher than the predefined threshold.

12. The non-transitory storage medium of claim 11, further comprising:

ranking the alt-texts having a similarity score higher than the predefined threshold based on their similarity scores; and selecting the one of the one or more alt-texts having a highest ranking.

13. The non-transitory storage medium of claim 11, further comprising:

providing a notification when none of the one or more alt-texts have a similarity score higher than the predefined threshold.

14. The non-transitory storage medium of claim 10, wherein the ML model is a Contrastive Language Image Pretraining (CLIP) model.

15. The non-transitory storage medium of claim 10, wherein calculating, based on the first and second embedding representations comprises:

combining the first embedding representation and the second embedding representation to generate a muti-modal embedding matrix; and using the muti-modal embedding matrix in the similarity score calculation.

16. The non-transitory storage medium of claim 10, wherein the similarity score is a cosine similarity score.

17. The non-transitory storage medium of claim 10, wherein selecting the one of the one or more alt-texts having the highest final score comprises:

comparing the final score of each of the one or more alt-texts with a predefined threshold; and selecting the one of the one or more alt-texts having the highest final score from the alt-texts having a final score higher than the predefined threshold.

18. The non-transitory storage medium of claim 17, further comprising:

providing a notification when none of the one or more alt-texts have a final score higher than the predefined threshold.

* * * * *